Patented Jan. 11, 1949

2,458,562

UNITED STATES PATENT OFFICE 2,458,562

PROCESS FOR PRODUCING A MOLDING MATERIAL AND THE ARTICLE PRODUCED

James Andrew Clark, White Plains, N. Y., assignor, by mesne assignments, to American Viscose Corporation, Wilmington, Del., a corporation of Delaware No Drawing. Application December 22, 1945, Serial No. 637,104

4 Claims. (Cl. 260—742)

This invention relates in general to granulated molding materials adapted to be molded into shaped articles by the application of heat and pressure, and in particular to a molding powder containing a vulcanizable rubber material, and to articles molded therewith.

Heretofore, a number of processes have been proposed for the manufacture of a granulated molding material containing crude rubber and a cellulosic filler, such as wood pulp. However, since such rubber is solid and does not wet the fibres, it was necessary to mill the mixture for a long time to disperse the fibres therein. Nevertheless, such products have been far from satisfactory. Articles molded therefrom crack under slight bending pressures, and upon cleavage, the filler dusts or rubs out. Use of these granular materials for such purposes as tiling, heavy linoleums, industrial flooring, and the like, has been severely limited both by the expensive processing operations involved and by the poor physical quality of the products. These undesirable properties are generally recognized to be due to the failure of the rubber to wet the cellulosic filler, and while numerous attempts have been made to remedy these defects, none has heretofore been successful in overcoming this fundamental fault.

It has been proposed to form a mixture of viscose and rubber latex to which various fillers may be added. However, when the viscose is coagulated by acid or heat, there is invariably produced a large quantity of gas so that such a composition is not adapted for use in molding articles by compression molding since the gas liberated in the mold produces blisters and porous products. Moreover, articles molded from such compositions contain finely divided sulfur and oxides of sulfur, which react with moisture to produce acids in situ. Such acids result in embrittlement and discoloration of the product.

It is an object of the present invention to provide a process for the manufacture of comminuted molding materials containing rubber, whereby milling of the various ingredients is obviated.

It is a further object of this invention to provide a process for the manufacture of molding materials containing rubber and a cellulosic filler whereby more complete uniformity of dispersion of the fillers in the rubber is attainable, without the necessity of milling operations, than has heretofore been possible.

It is a still further object of the present invention to provide a process for the manufacture of molding materials containing latex which permits the utilization of cellulosic fillers of very substantially greater particle size than has hitherto been possible.

It is another object of this invention to provide molding compositions containing latex exhibiting greatly improved bonding characteristics and negligible, if any, dusting or rubbing out of filler upon cleavage.

It is an additional object of the present invention to provide molding compositions containing latex which are capable of being vulcanized to a desirably hard condition after having been formed into the desired shapes.

It is a further object of the invention to provide a molding material which can be molded by compression without the development of gases in the molded material and which will be chemically inert and stabel on ageing.

Other and ancillary objects of this invention will in part be obvious and will in part appear hereinafter.

According to the present invention a comminuted molding material is produced by mixing together an alkali-soluble water-insoluble cellulose ether dissolved in alkali with a latex containing natural or synthetic rubber, a filler, preferably a cellulosic filler, and customary vulcanization agents, simultaneously coagulating the natural or synthetic rubber and the cellulose ether while the filler is uniformly dispersed therein. The material may be formed in a comminuted condition in several ways: (a) by mixing the composition with a coagulant while stirring or agitating so that the precipitant takes the form of crumbs or granules; or (b) the composition is extruded, cast, or otherwise shaped into a layer, film, filament or rod, and coagulated in that form, thereafter the shaped structure so produced is comminuted mechanically by grinding, chopping, or cutting.

As examples of the water-insoluble, alkali-soluble cellulose ethers, there may be used alkyl cellulose ethers, hydroxyalkyl cellulose ethers, carboxyalkyl cellulose ethers, mixed ethers such as the alkyl-hydroxyalkyl cellulose ethers, and the like. The alkyl cellulose ethers comprise methyl cellulose, ethyl cellulose, propyl cellulose, and the like. The hydroxyalkyl ethers of cellulose comprise hydroxymethyl cellulose ethers, hydroxyethyl cellulose ethers, as well as mixed alkyl-hydroxyalkyl cellulose ethers such as methyl hydroxyethyl cellulose and the like. The carboxyalkyl cellulose ethers which may be employed comprise cellulose glycolic acid ether and homologues thereof. These cellulose ethers may be dissolved in an aqueous solution of strong alkali such, for example, as the hydroxides of the alkali metals and the quaternary ammonium bases.

The rubber latex employed may be natural or synthetic rubber latex or concentrated or creamed natural rubber latex, or pre-vulcanized rubber latex. Further, the latex may be heat-sensitized by adding to it suitable heat-unstable materials adapted to cause coagulation upon heating. The invention is not limited to the use of natural rubber latex but may employ also artificial latices formed by dispersing synthetic rubbers in water containing a suitable protective colloid and dispersing agent. The synthetic rubber may comprise, for example, polymerized butadiene, olefine-polysulfides, e. g. "Thiokol," isobutylene polymers, chloroprene polymers and polyvinyl halides, e. g. "Koroseal."

The usual rubber compounding ingredients such as sulfur, zinc oxide; accelerators such, for example, as diphenyl guanidine, "Pip-Pip" (piperidine pentamethylene dithiocarbamate), "Captax" (mercaptobenzothiazole), and tetramethylthiuram disulfide; antioxidants such as "Antox" (condensation product of butyraldehyde-aniline), "Santiflex B" (reaction product of acetone and p-aminodiphenyl) and "Agerite Alba" (p-benzyloxy-phenol); lubricants such as stearic acid, "Seriate" (a kind of muscovite), and "Aresplene" (a proprietary product alleged to be the sodium salt of an alkylated aryl compound sold by Monsanto Chemical Co.); may be added to the latex or to the mixture with the cellulose ether. On the other hand, if pre-vu'canized latex is to be added to the cellulose ether solution, the use of additional rubber compounding agents is optional.

As a filling material, there is preferably employed a cellulosic filler such, for example, as wood pulp or wood flour. Other suitable fillers are asbestos fibres, mineral wool, glass fibres, and mineral pigments.

The proportions of the several ingredients in the liquid composition may be varied over a wide range. In general, however, the aqueous dispersion may comprise from 1 to 12 per cent by weight of the cellulose ether, from 2 to 16 per cent by weight of a fixed alkali, from 2 to 12 per cent by weight of rubber (solid basis), vulcanizing agents from .1 to 1 per cent, the remainder water. To this solution there is added a filler in an amount equal to 10 to 200 per cent by weight of the solid ingredients of the liquid dispersion. In the preferred embodiment there is employed an aqueous solution containing 3 to 8 per cent alkali metal hydroxide, 4 to 8 per cent alkali-soluble, water-insoluble cellulose ether and sufficient latex to yield 3 to 9 per cent by weight of rubber on the weight of the solution.

Coagulation of the mixture may be effected in any of a number of ways. Thus, for example, there may be employed any of the known coagulants of either the cellulose ether or the rubber latex such, for example, as an acid, an acid gas, an acid salt, or mixtures of salts and acids, or by heating to a temperature in excess of 60° C. in the presence or absence of a chemical coagulant.

After coagulation is complete, the resultant mass is drained of supernatant liquid, washed with water containing a trace of an alkaline compound to neutralize any residual acids present, and then dried.

As previously mentioned, the composition may be given a comminuted form in several ways, but in the preferred procedure the composition of latex, cellulose ether, filler and curing ingredients is mixed with the coagulant either by adding the coagulant to the composition or by adding the composition to the coagulant, while simultaneously stirring or agitating so as to cause the precipitant to form in the shape of crumbs or granules. The particle size and shape of the crumbs can be varied by changing the concentration of the rubber and cellulose ether in the composition. For example, with increase in concentration, larger globules and crumbs are formed, while with very dilute compositions, a finely divided powder can be produced. Further variation can be made in the particle size by increasing or decreasing the stirring or agitating. Moreover, by using a rapid coagulant such as a strong acid in high concentration, finer particles are produced than when using a weak coagulant in a more dilute solution of the coagulant.

For purposes of further description and of illustration only but in no way to be interpreted in a limiting sense, there follow examples of the present invention according to presently preferred practice:

*Example*

The following formula was prepared (all amounts represent parts by weight):

| | |
|---|---:|
| Alkali-soluble, water-insoluble cellulose ether | 100.0 |
| Caustic soda | 100.0 |
| Water | 2436.0 |
| Wood flour | 628.0 |
| Colloidal sulfur (64.5 per cent) | 11.6 |
| Accelerator: Captax | 2.5 |
| Zinc oxide (60.6 per cent) | 12.3 |
| Agerite white | 2.5 |
| Mold lubricant: Stearic acid (as a soap in 20 ml. 25 per cent NaOH solution) | 2.5 |

To the resultant solution was added an alkaline dispersion comprised of 373.5 parts by weight of 64.5 per cent latex, 33 parts by weight of sodium hydroxide, and 1500 parts by weight of water, and the mixture agitated until a thin, creamy homogeneous mass resulted. This composition was then added slowly to about 10,000 parts by weight of 5 per cent sulfuric acid while the mixture was vigorously stirred. Agitation was continued for a short time after addition of the acid solution until coagulation was completed. The separate small crumbs thus formed were water-washed (decantation) twice with water and then with water containing about 0.5 per cent ammonium hydroxide to neutralize traces of any residual acid in the material. The drained product was dried at a temperature of about 90–95° C. and powdered. The powdered material was molded and vulcanized by heating at about 125° C. for approximately 30 minutes in a mold under a pressure of about 350 pounds per square inch. Upon removal from the mold, the material was firm and regular in color. Upon breaking, it was found to be uniform in composition and texture and exhibited no dusting or rubbing out of the filler.

The process of the present invention is unique in obviating the necessity for milling which is not only an expensive operation but one in which the uniformity of mixture varies directly as the milling time involved. It is also unique in resulting in a far more intimate mixture of rubber and cellulosic filler than has heretofore been possible due, it is believed, to the fact that the addition of the alkali results in thorough wetting of the filler by the rubber. It has been found that the alkali used for maintaining the cellulose ether in solution is an advantage in that it swells the cellulosic filler and thoroughly wets the filler and reduces the amount of air occluded between the fibres of the filler. The swelling of the fibres by the alkali appears to increase the adhesion of the rubber to the cellulosic fibre.

At the same time, the cellulosic or other fillers employed in the practice of the present invention may be of substantially greater particle size than has heretofore been found permissible. Molding products produced in accordance with this invention exhibit a desirable degree of resilience and negligible, if any, dusting or rubbing out of filler upon cleavage. These products are useful per se in a number of important applications such as those hereinabove set forth and in addition may be used as an anchoring layer to form a much more retentive bond between cellulosic materials and rubber. A further advantage, according to the present invention, resides in the ability of the alkali employed not only to effect wetting of the cellulosic filler by the rubber, but also in protecting the rubber from oxidation, since the cellulose ethers are not themselves subject to oxidation. In addition, the cellulose ethers employed in the present invention enable the viscosity of the composition to be varied very simply and thus make the process much more flexible in industrial application since the viscosity of rubber latex alone is not easily varied per se.

I claim:

1. A composition comprising a substantially dry and neutral, vulcanizable molding powder, the particles of which comprise a coagulated mixture of 1 to 12 parts by weight of an alkali-soluble, water-insoluble cellulose ether, 2 to 12 parts by weight of rubber, 0.1 to 1 part by weight of vulcanizing material, and an amount of a filler between 10 and 200 percent by weight of the other solids.

2. A composition comprising a substantially dry and neutral, vulcanizable molding powder, the particles of which comprise a coagulated mixture of 4 to 8 parts by weight of an alkali-soluble, water-insoluble cellulose ether, 3 to 9 parts by weight of rubber, 0.1 to 1 part by weight of vulcanizing material, and an amount of a filler between 10 and 200 percent by weight of the other solids.

3. The composition of claim 2 in which the filler is cellulose fiber.

4. The composition of claim 3 in which the rubber is natural rubber.

JAMES ANDREW CLARK.

REFERENCES CITED

The following references are of record in the file of this patent:

UNITED STATES PATENTS

| Number | Name | Date |
|---|---|---|
| 1,706,295 | Jacobsohn | Mar. 19, 1929 |
| 2,016,286 | Levin | Oct. 8, 1935 |
| 2,076,781 | Jacobsen | Apr. 13, 1937 |
| 2,391,867 | Clark | Jan. 1, 1946 |

FOREIGN PATENTS

| Number | Country | Date |
|---|---|---|
| 305,490 | Great Britain | May 5, 1930 |
| 762,342 | France | Apr. 9, 1934 |